Figure 1:
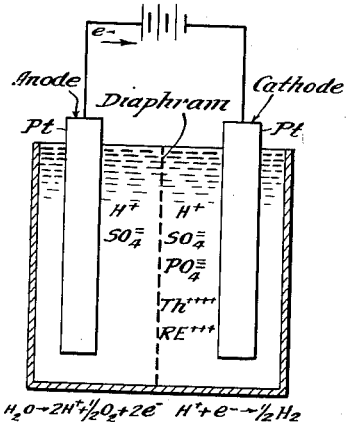

INVENTOR.
Edgar C. Pitzer

United States Patent Office 2,713,554
Patented July 19, 1955

2,713,554

ELECTROLYTIC METHOD OF RECOVERING THORIUM FROM MONAZITE SAND

Edgar C. Pitzer, Schenectady, N. Y., assignor to the United States of America as represented by the United States Atomic Energy Commission Application January 6, 1949, Serial No. 69,563

6 Claims. (Cl. 204—90)

This invention is concerned with a method for separating thorium from contaminating elements. More particularly, it is concerned with the separation of thorium from the rare earths with which thorium is associated in its ores such as monazite sand.

In this specification and the claims the name of the element designates generically the element both in its free state and combined in a compound. The element in its free state is designated by the term "elemental" or by its specific state, such as "metallic."

Thorium is most commonly found in the natural state in monazite sand. Monazite sand comprises a complex phosphate of thorium and rare earths, particularly cerium, lanthanum, and yttrium. The normal process for recovering thorium from the monazite sand depends upon the fact that thorium phosphate is less soluble in a dilute acidic solution than are the phoshpates of the rare earths with which it is contaminated. The monazite sand is usually fumed with sulfuric acid whereby the thorium and rare earths are brought into solution, and the solution is filtered to remove insoluble sand and gelatinous silica and other such insoluble material. The thorium is then precipitated as the phosphate leaving the rare earth phosphates in solution. This is accomplished either by diluting the solution to such an extent that the acidity is reduced by hydrolysis or by neutralizing the excess acidity with hydroxide. The hydroxides and carbonates of the alkali group cannot be used as neutralizing agents because of the formation of insoluble double sulfates, so magnesia is commonly employed as the neutralizing agent. These methods of separating the thorium from the rare earths with which it is contaminated have certain inherent disadvantages. The neutralization by dilution makes necessary the processing of large quantities of solution to separate the thorium. Recovery of lanthanum and cerium is also less convenient from the dilute solution. The neutralization with magnesia introduces an added contaminant. The chief disadvantage in this method, however, is that introduction of the magnesia into the solution results in local spots of high alkalinity in the solution, causing the rare earth phosphates to precipitate in these spots, and it is very difficult to redissolve these rare earth phosphates. This results in excessive carrying of rare earth phosphates with the thorium phosphate when it is separated from solution.

It is an object of this invention to provide a novel method of separating thorium from the rare earths with which it is contaminated in thorium ores.

Additional objects and advantages of this invention will be apparent from the following description.

This invention comprises broadly the treatment of an aqueous acidic solution containing ions of thorium, rare earths, and phosphate in an electrolytic cell, so that the hydrogen ion concentration is decreased by electrolytic action. As a result of this electrolytic decrease of the hydrogen ion concentration the thorium is precipitated as the phosphate while the rare earth ions remain in solution. This precipitate is then separated from the solution and the thorium is further concentrated in the customary manner.

The advantages resulting from the use of this process will be readily apparent. Reduction of acidity takes place gradually, thus preventing the localized spots of relatively high alkalinity which result in the formation of the rare earth phosphates. The quantity of rare earths carried with the thorium phosphate is thus greatly reduced. An additional advantage is that the recovery of the rare earths from the spent liquor is not complicated by the introduction of extraneous ions or by excessive dilution.

In the process of obtaining thorium from monazite sand, the monazite sand is first fumed or digested with sulfuric acid to bring the thorium and the rare earth phosphates into solution. The sulfuric acid solution is then diluted and filtered to remove silica and other insoluble material. By the process of this invention the hydrogen ion concentration in the solution is then reduced by electrolytic action to a range within which precipitation of the thorium phosphate, but not the rare earth phosphates occurs. This range was experimentally determined as shown by the following example.

Figure 2:
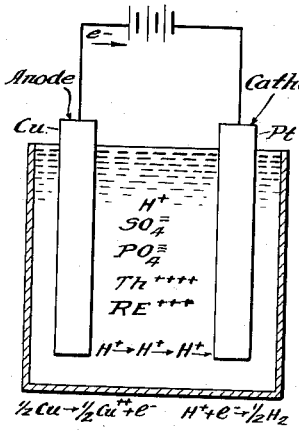
Figure 3:
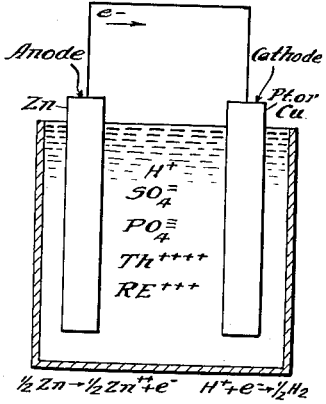

Figures 1, 2, and 3 respectively show three schematic embodiments of the invention.

Figure 4:
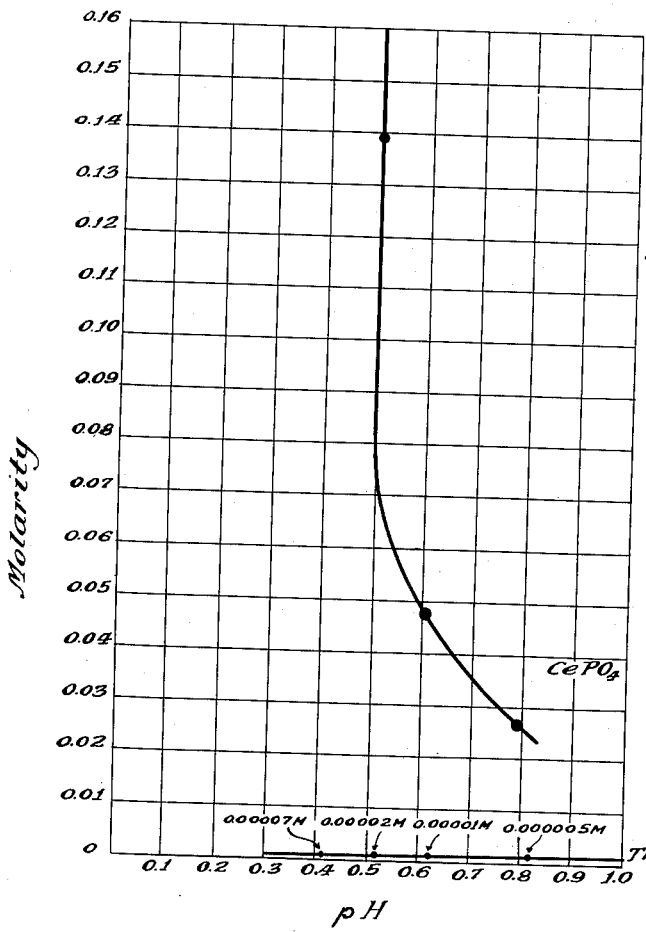

Fig. 4 shows graphically the relationship between pH and solubility of $CePO_4$ and $Th_3(PO_4)_4$.

EXAMPLE I

Four solutions were made up to a volume of 200 cc. each, containing 0.5 M $H_3PO_4$, and 0.085 M, 0.17 M., 0.193 M and 0.34 M, $H_2SO_4$, respectively. To these solutions

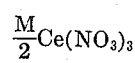

solution was added from a burette, with continual stirring, until faint, permanent precipitates were obtained. To similar solutions 0.045 M $Th(NO_3)_4$ was added in a similar manner. Measurements of pH were made with a Beckman pH meter. The amounts of cerium and thorium required were tabulated as follows:

Table 1

| Solution No. | Initial pH | 0.5 M Ce(NO₃)₃ solution added, cc. | Final pH | Concentration of Ce⁺³ at precipitation point M | 0.045 M Th(NO₃)₄ solution added, cc. | Final pH | Concentration of Th⁺⁴ at precipitation point M |
|---|---|---|---|---|---|---|---|
| 1 | 0.81 | 11.5 | 0.78 | 0.0272 | 0.025 | Unchanged | 5.62×10⁻⁶ |
| 2 | 0.62 | 21.0 | 0.60 | 0.0475 | 0.05 | do | 1.125×10⁻⁵ |
| 3 | 0.51 | 77.0 | 0.50 | 0.139 | 0.10 | do | 2.25 ×10⁻⁵ |
| 4 | 0.41 | *78.0 | 0.41 | 0.140 | 0.30 | do | 6.75 ×10⁻⁵ |

*Extremely faint precipitate not comparable with thorium precipitate even after addition of 100 cc. Ce(NO₃)₃.

Evidently, precipitation of thorium occurs at a pH as low as 0.41, whereas a relatively large amount of cerium is soluble even at a pH=0.51. The solubilities will undoubtedly vary with the relative concentrations of $H_2SO_4$ and $H_3PO_4$. The results of this example are shown graphically in Fig. 4. From examination of this graph it is apparent that thorium may be quite completely separated from the rare earths with which it is associated in monazite sand, by dissolving the monazite sand in a sulfuric acid solution and electrolyzing the solution in such a way that hydrogen ion is reduced to elemental hydrogen until the pH has risen to between 0.4 and 0.5. The lower limit of the pH of the solution when it is introduced into the electrolytic cell is not critical provided that the ions are in solution. From a standpoint of conservation of electrical energy, however, it is desirable that the pH of the solution be not too far below that point at which the thorium ions are insoluble in the solution.

There are several ways in which the electrolytic cell may be constructed to effect the desired reduction of the hydrogen ion concentration. In the preferred embodiment shown schematically in Fig. 1, the electrodes are of platinum and are separated with a porous membrane. A suitable source of electrical energy such as a battery is connected to the electrodes and the thorium-rare earth solution is placed in the cathode compartment. The anode compartment may also contain the process solution or a dilute acid such as sulfuric or nitric acid. In this type of cell the hydrogen ion in the catholyte will be reduced by electrolysis to atomic hydrogen, which in turn combines to form molecular hydrogen, thus decreasing the hydrogen ion concentration in the catholyte. One advantage of using this type of electrolytic cell is that a spent solution may be used as the anolyte, in which case the cerium in the spent solution will be oxidized at the anode from the cerous to the ceric state, thus making its subsequent chemical separation from the spent solution a simpler process.

In another embodiment the insoluble platinum anode is replaced with a suitable soluble anode such as a copper anode. In this cell the reaction in the catholyte is the same as that shown in the cell in Fig. 1, but the reaction in the anolyte comprises the oxidation of the copper anode. The hydrogen ions in the cell migrate to the cathode and are discharged by reaction at the cathode surface, thus permitting the critical reduction of the hydrogen ion concentration throughout the entire cell. This type of cell has certain advantages which are not obtained in the cell shown in Fig. 1. No diaphragm is necessary as shown in the embodiment illustrated in Fig. 2. The power requirements are lower and the changing of the anolyte during electrolysis may be avoided. However, it is necessary to vibrate the copper anode continuously because of the formation of a heavy gelatinous precipitate on its surface.

Still a third type of electrolytic cell is shown in Fig. 3. This cell relies upon internal electrolysis, employing a metallic couple such as iron, or preferably zinc, as the anode and platinum or copper as the cathode.

The precipitate which forms in the process solution upon reduction of the hydrogen ion concentration is believed to be either thorium phosphate or thorium basic phosphate. The precipitate may be separated from the solution by any of the usual methods, such as centrifugation, filtration, or decantation. The thorium may then be further concentrated and purified by customary methods such as the dissolution of the precipitate and reprecipitation of the thorium as the oxalate or iodate.

Now that the process has been generally described, it may be further illustrated by the following specific examples.

EXAMPLE II

A 100-gram sample of monazite sand was digested for four hours with 150 cc. of hot concentrated $H_2SO_4$. After cooling, the mass of salts was agitated with about 1500 cc. of water. This solution was filtered to remove unreacted sand, gelatinous silica, etc. An electrolytic cell was then set up comprising a 1000 cc. beaker and a porous cup of about 200 cc. capacity. Very dilute $H_2SO_4$ was poured into the cup, and 250 cc. of the above solution into the beaker surrounding the cup. A platinum wire was placed in each compartment, and a current of two amperes was passed through the cell (positive electrode inside the cup) until a precipitate was formed in the beaker. This precipitate was filtered off, digested with hot sodium hydroxide solution and the residue was then thoroughly washed and dissolved in hydrochloric acid. A precipitate was then formed by treating the catholyte with oxalic acid. This precipitate was separated from the supernatant solution, washed, digested with hot ammonium oxalate solution and filtered. The filtrate was then acidified with hydrochloric acid whereupon thorium oxalate was re-precipitated. The thorium oxalate was then recycled through another oxalate precipitation cycle. The third oxalate precipitate was dissolved in hot $HNO_3$ and $H_2SO_4$ and the thorium precipitated from this solution as the iodate in a substantially pure form.

EXAMPLE III

Fifty grams of Brazilian monazite sand were digested with 100 cc. of concentrated $H_2SO_4$, diluted, filtered, and further diluted to a liter. The electrolysis was conducted in an apparatus comprising a 600-cc. beaker, a porous porcelain cup, and two platinum spirals. The source of current was a 6-volt storage battery. The anolyte consisted of 100 cc. of the process solution inside the cup, and the catholyte was 200 cc. of process solution outside the cup. The voltage drop across the cell averaged 5.8 volts and the current about 1.5 amperes. After an hour's operation the pH of the anolyte had decreased from an initial value of 0.19 to 0.08, indicating that acid was migrating towards the anode. The anolyte was replaced by 100 cc. of water and electrolysis was resumed. At the end of six hours a heavy gelatinous precipitate had formed in the catholyte, where the pH had risen from 0.19 to 0.38. The precipitate was then separated from the solution, washed, and treated as described in the preceding example by successive precipitations with oxalate and iodate to obtain substantially pure thorium iodate.

EXAMPLE IV

A cell similar to that described in Example III, except that the anode was a copper spiral rather than a platinum wire, was set up. Electrolysis was commenced and it was necessary to vibrate the copper anode continuously because of the formation of a heavy gelatinous precipitate on its surface. A thick gel formed in the anolyte in thirty minutes and a similar precipitate began to form in the catholyte in ninety minutes. At the end of three hours the pH of the catholyte had risen from 0.19 to 0.35 and a heavy gelatinous precipitate had formed. The precipitate was separated from the solution and further treated as described above. It is difficult to make accurate measurements upon this cell but the average voltage drop was 5.2 volts, and the average current was 2.1 amperes during three hours. Thus, not only the time but also the watt-hour consumption was decreased from Example II by using the copper anode.

EXAMPLE V

An internal electrolytic cell was set up by clamping a copper wire to a sheet of zinc and immersing the couple in the process solution. Rapid evolution of hydrogen took place at the copper wire at once and a precipitate formed in the solution in a few minutes. The precipitate was removed from the solution when the pH of the solution had increased to 0.41 and the thorium precipitate was then further purified by the treatment described above.

It is to be understood, of course, that the above examples are merely illustrative and do not limit the scope of this invention. Mixtures of thorium and rare earths other than those obtained from monazite sand may be used as starting materials and other acids, electrodes, and electrolytic cells may be substituted for those of the above examples, within the scope of the foregoing description. In general, it may be said that the use of any equivalents or modifications of procedure which would naturally occur to one skilled in the art is included in the scope of this invention. Only such limitations should be imposed upon the scope of this invention as are indicated in the appended claims.

What is claimed is:

1. The process of separating thorium from a rare earth, which comprises electrolyzing an aqueous acidic solution containing essentially thorium ions, rare earth ions, and phosphate ions, to a pH of not greater than 0.5 whereby the thorium is precipiated as a thorium phosphate leaving the rare earth ions in solution, and separating the thorium phosphate thus formed from the solution.

2. The process of claim 1, wherein the electrolysis is carried out in an electrolytic cell comprised of two platinum electrodes, separated within the cell by a porous diaphragm and said electrodes connected to a suitable source of electrical energy.

3. The process of claim 1, wherein the electrolysis is carried out in an electrolytic cell comprised of a platinum cathode and a copper anode, said anode and cathode connected to a suitable source of electrical energy.

4. The process of claim 1, wherein the electrolysis is carried out in an electrolytic cell comprised of a copper cathode and a zinc anode connected by an electrical conductor.

5. The process of separating thorium from rare earth contaminants with which thorium is normally associated in monazite sand, which comprises introducing an aqueous sulfuric acid solution having a pH of less than 0.4 and containing essentially ions of thorium, said rare earth contaminants, and phosphate, into a porous diaphragm electrolytic cell containing platinum electrodes, electrolyzing said solution until the pH has increased to greater than 0.4 but less than 0.5, and separating the thorium phosphate thus formed from the rare earth-containing solution.

6. The process of separating thorium from rare earths which comprises forming a dilute sulfuric acid solution of said thorium and rare earths containing phosphate ions, placing said solution in the cathode compartment of a diaphragm electrolytic cell, placing dilute sulfuric acid in the anode compartment of said cell, subjecting said cell to electrolysis until the pH of the solution within the cathode compartment is within the range of from 0.4 to 0.5, and separating the thorium phosphate precipitate formed in said cathode compartment.

References Cited in the file of this patent

UNITED STATES PATENTS

| | | |
|---|---|---|
| 572,512 | Albert | Dec. 8, 1896 |
| 1,572,846 | Hoff | Feb. 9, 1926 |
| 2,407,008 | Hixson et al. | Sept. 3, 1946 |
| 2,425,573 | Soddy | Aug. 12, 1947 |

OTHER REFERENCES

Chemical Abstracts, vol. 42, pp. 5787–89, August 20, 1948.

Abstract of "New Elements in Monazite Sand," Rajendralal De (Univ. Dacca., Bengal, India). Separate (Univ. Dacca), January 1947, 21 pp.